May 5, 1953  H. MARX  2,637,243

VARIABLE PHASE CONTRAST MICROSCOPE

Filed April 26, 1949

INVENTOR
HELMUT MARX
BY Fred A. Klein
ATTORNEY

Patented May 5, 1953

2,637,243

UNITED STATES PATENT OFFICE 2,637,243

VARIABLE PHASE CONTRAST MICROSCOPE

Helmut Marx, Giessen, Germany, assignor to Ernst Leitz, G. m. b. H., Wetzlar, Germany, a corporation of Germany Application April 26, 1949, Serial No. 89,652
In Germany November 20, 1948

7 Claims. (Cl. 88—39)

This invention relates to optical devices and more particularly to microscopes utilizing the so-called phase contrast method for producing optical images of non-luminous objects. In such microscopes, there may be provided an optical system comprising, on the side of the light source, an annular diaphragm, or a diaphragm consisting of a plurality of disk-like apertures, said diaphragm throwing an image upon a so-called phase plate, by means of the condenser and the objective lenses. The phase plate lies in the rear focal plane of the objective, or a corresponding plane, the shape of said phase plate being congruent with the image of the diaphragm. However, with such a phase plate, which is so arranged that it imparts in its annular portion a phase displacement to the rays compared to the rays passing through the rest of the plate, only one phase difference is obtainable.

It is also known to practice the phase contrast method by the use of specially arranged polarizing means and such arrangements are disclosed, for instance, by Harold Osterberg (Journal of the Optical Society of America, volume 37, No. 9, pages 726 to 730, "The Polanret microscope"). With the latter arrangements, any phase difference between 0° and 360° is obtainable.

It is an object of the present invention to provide an improved phase plate arrangement making it possible to obtain any desired phase difference with a microscope of the general nature described in the introductory portion of this specification.

An efficient construction of the phase contrast microscope according to this invention is accomplished by the provision of at least two phase plates arranged in series in the optical axis, each pair of phase plates having in the place of the diaphragm image a circularly cuneiform layer or thickness, whereby one full rotation results in a $n \times 360°$ ($n=1, 2, 3 \ldots$) larger phase difference. The two phase plates are mounted for rotation. Generally, one such pair of phase plates is sufficient but the invention contemplates the use of several similarly arranged pairs of phase plates if found desirable in specific instances.

If the diaphragm is composed of several disk-like apertures, the congruent, disk-like surfaces of the phase plate (say $x$ in number) have thicknesses increasing by $$\frac{n360°}{x}$$

In case of an annular diaphragm image, the thickness of the congruent surface on the phase plate increases in a cuneiform manner.

Upon rotation against each other of the phase plates thus constructed, there is obtained a uniform variation in the thickness throughout the diaphragm image area on the phase plates, corresponding in each case to a particular phase displacement. The thickness between the transition points of the individual plates from the largest to the smallest thickness is different by $n \times 360°$ as compared to the thickness of the remaining portion, and there is thus produced the same phase displacement.

The drawing shows two embodiments of the invention as follows.

Figure 1:
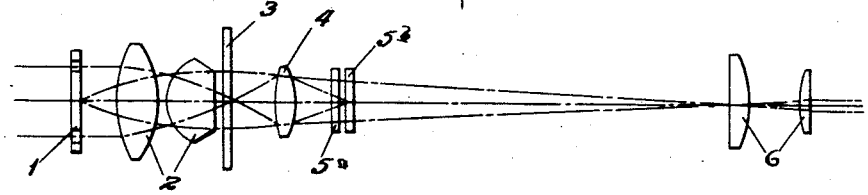
Fig. 1 represents a schematic axial section through the optical system of a phase contrast microscope.

Referring more particularly to Fig. 1, there is shown a condenser diaphragm 1, the congruent image of which is projected by condenser 2 and objective 4 upon the phase plates 5a and 5b which are provided in the rear focal plane of the objective.

The slide or mount 3 is viewed through eyepiece 6.

Figure 2:
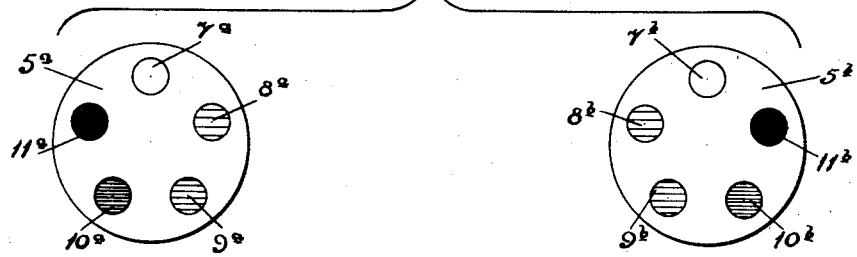
Fig. 2 shows two phase plates each having a set of disk-like diaphragm image areas.

In the embodiment of Fig. 2, the two phase plates 5a and 5b are provided by way of example, with five disk-like phase areas 7a, 8a, 9a, 10a and 11a, and 7b, 8b, 9b, 10b and 11b, respectively, it being understood that the condenser diaphragm 1 is congruently constructed. As shown by shading, the thickness of the said disk-like areas increases in a clockwise direction on plate 5a and counter-clockwise on plate 5b, each successive pair increasing in thickness by substantially the same amount. These thicknesses may be varied in accordance with the instrument used and the results desired and the present invention is in no way limited to specific thickness.

Figure 3:
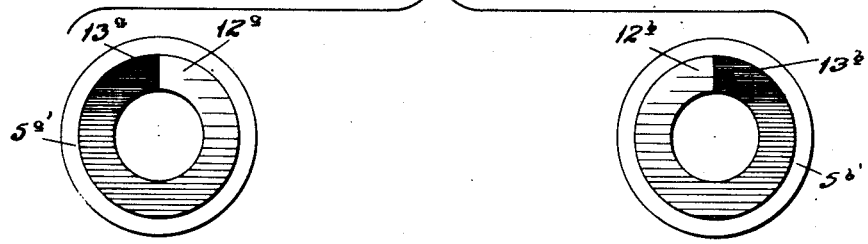
Fig. 3 shows two phase plates having annular cuneiform areas.

The phase plates shown in Fig. 3 are intended to be used in connection with a condenser diaphragm having an annular opening. The congruently formed thickened portions of the phase plates have a cuneiformly increasing thickness (also indicated by shading), said thickness on plate 5a' increasing clockwise from 12a to 13a, while it increases similarly but counter-clockwise on plate 5b' from 12b (having substantially the same thickness as 12a) to 13b (having substantially the same thickness as 13a).

Figure 4:
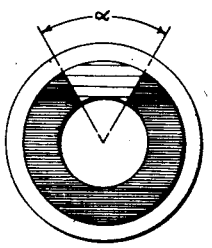
Fig. 4 illustrates the effect of the phase plates of Fig. 3 where the plates have been rotated against each other by an angle $a°$.

By disposing the phase plates of Figs. 2 or 3 one after the other by rotating the said plates by a certain angle α (see Fig. 4) against each other, the total or combined thickness of the phase areas of the two phase plates will be the same at all points except the area between the two points of transition from maximum to minimum thickness, in which area the thickness differs from the remainder area by a value of $n \times 360°$.

I claim:

1. In a phase microscope having a generally annular condenser diaphragm whose image is projected by a condenser and an objective in an exit pupil of the objective: at least one pair of phase plates adjacent each other and disposed in the exit pupil, a generally annular light phase-changing layer increasing in thickness in clockwise direction on one of said plates, and a generally annular light phase-changing layer increasing in thickness in counter-clockwise direction on the other of said plates, the two phase plates being mounted for rotation relative to each other.

2. Phase plates as defined in claim 1, wherein the thickness of one of said layers increases cuneiformly in clockwise direction while the thickness of the other layer increases cuneiformly in counter-clockwise direction.

3. In a phase microscope having a generally annular condenser diaphragm, a condenser, and an objective with an exit pupil, an image of the diaphragm being projected in the exit pupil by means of the condenser and objective: at least one pair of phase plates arranged adjacent each other in the rear focal plane of the objective, a generally annular light phase changing layer increasing in thickness in clockwise direction on one of said plates, and a generally annular light phase changing layer increasing in thickness in counter-clockwise direction on the other of said plates, the two phase plates being mounted for rotation relative to each other.

4. In a phase microscope having a generally annular condenser diaphragm arranged concentrically with respect to the optical axis of the microscope, the image of the diaphragm being projected by a condenser and an objective in an exit pupil of the objective: at least one pair of phase plates arranged adjacent each other in said optical axis and disposed in the exit pupil, a light phase-changing layer congruent with the diaphragm image projected thereon on each phase plate, the layer on one phase plate increasing in thickness in clockwise direction, and the layer on the other phase plate increasing in thickness in counter-clockwise direction, said plates being mounted for rotation relative to each other so that after a complete rotation of one plate relative to the other there is produced a phase difference increment of $n \times 360°$ ($n$ being an integer of 1 or more).

5. In a phase microscope having a condenser diaphragm of a plurality of apertures arranged annularly around the optical axis of the microscope, the image of the diaphragm being projected by a condenser and an objective in an exit pupil of the objective: at least one pair of phase plates arranged adjacent each other in said optical axis and disposed in the exit pupil, a plurality of light phase-changing layers congruent with the image of said diaphragm apertures projected thereon on each phase plate, each successive layer on one phase plate increasing in thickness with respect to that of the preceding layer in clockwise direction, and each successive layer on the other phase plate increasing in thickness with respect to the preceding layer in counter-clockwise direction, said plates being mounted for rotation relative to each other so that after a complete rotation of one plate relative to the other there is produced a phase difference increment of $n \times 360°$ ($n$ being an integer of 1 or more).

6. Phase plates as defined in claim 5, wherein said diaphragm apertures are circular and said congruent phase-changing layers increase successively by a predetermined thickness, said thickness being expressed by the formula $$\frac{n \times 360°}{m}$$

($n$ being an integer of 1 or more, and $m$ being the number of apertures).

7. In a phase microscope having a generally annular condenser diaphragm whose image is projected by a condenser and an objective in an exit pupil of the objective: at least one pair of phase plates adjacent each other and disposed in a plane corresponding to the rear focal plane of the objective, a generally annular light phase-changing layer increasing in thickness in clockwise direction on one of said plates, and a generally annular light phase-changing layer increasing in thickness in counter-clockwise direction on the other of said plates, the two plates being mounted for rotation relative to each other.

HELMUT MARX.

References Cited in the file of this patent

UNITED STATES PATENTS

| Number | Name | Date |
|---|---|---|
| 2,244,687 | Goldsmith et al. | June 10, 1941 |
| 2,427,689 | Osterberg et al. | Sept. 23, 1947 |

FOREIGN PATENTS

| Number | Country | Date |
|---|---|---|
| 636,168 | Germany | Oct. 7, 1936 |